(12) United States Patent
Takahashi et al.

(10) Patent No.: US 10,053,644 B2
(45) Date of Patent: Aug. 21, 2018

(54) REFRIGERATOR OIL, AND WORKING FLUID COMPOSITION FOR REFRIGERATORS

(71) Applicant: JXTG Nippon Oil & Energy Corporation, Chiyoda-ku, Tokyo (JP)

(72) Inventors: Hitoshi Takahashi, Tokyo (JP); Tsutomu Takahashi, Tokyo (JP); Takeshi Okido, Tokyo (JP); Hiroko Shimpo, Tokyo (JP); Souichirou Konno, Tokyo (JP)

(73) Assignee: JXTG Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 15/116,110

(22) PCT Filed: Feb. 2, 2015

(86) PCT No.: PCT/JP2015/052860
§ 371 (c)(1),
(2) Date: Aug. 2, 2016

(87) PCT Pub. No.: WO2015/119080
PCT Pub. Date: Aug. 13, 2015

(65) Prior Publication Data
US 2017/0073602 A1 Mar. 16, 2017

(30) Foreign Application Priority Data
Feb. 5, 2014 (JP) .................................. 2014-020502

(51) Int. Cl.
| | | |
|---|---|---|
| *C09K 5/04* | (2006.01) | |
| *C10M 107/24* | (2006.01) | |
| *C10M 171/00* | (2006.01) | |
| *F25B 31/00* | (2006.01) | |

(52) U.S. Cl.
CPC ........... *C10M 107/24* (2013.01); *C09K 5/045* (2013.01); *C10M 171/008* (2013.01); *C09K 2205/122* (2013.01); *C09K 2205/126* (2013.01); *C10M 2209/043* (2013.01); *C10N 2220/302* (2013.01); *C10N 2230/06* (2013.01); *C10N 2240/30* (2013.01); *F25B 31/002* (2013.01); *F25B 2400/12* (2013.01); *F25B 2500/16* (2013.01)

(58) Field of Classification Search
CPC .............. C09K 5/045; C09K 2205/126; C09K 2205/122; C10M 107/24; C10M 171/008; C10M 2209/043; C10N 2220/302; C10N 2230/06; C10N 2240/30; F25B 2400/12; F25B 31/002; F25B 2500/16
USPC ......................................................... 252/68
See application file for complete search history.

(56) References Cited

U.S. PATENT DOCUMENTS

| | | | | |
|---|---|---|---|---|
| 2012/0132848 A1* | 5/2012 | Sawada | .................. | C09K 5/045 252/68 |
| 2015/0041704 A1* | 2/2015 | Saito | ..................... | C09K 5/045 252/68 |
| 2016/0244691 A1* | 8/2016 | Takahashi | .......... | C10M 171/008 |
| 2017/0218292 A1* | 8/2017 | Konno | .................... | C10L 5/442 |
| 2017/0327765 A1* | 11/2017 | Takahashi | .......... | C10M 171/008 |

FOREIGN PATENT DOCUMENTS

| | | |
|---|---|---|
| JP | H2-242888 A | 9/1990 |
| JP | H3-200895 A | 9/1991 |
| JP | H3-217495 A | 9/1991 |
| JP | H6-128578 A | 5/1994 |
| JP | H6-234814 A | 8/1994 |
| JP | 2001-064303 A | 3/2001 |

(Continued)

OTHER PUBLICATIONS

International Bureau of WIPO, International Search Report issued in International Application No. PCT/JP2015/052860 (dated Feb. 24, 2015).
International Bureau of WIPO, International Preliminary Report on Patentability issued in International Application No. PCT/JP2015/052860 (dated Aug. 18, 2016).

(Continued)

*Primary Examiner* — Douglas J McGinty
(74) *Attorney, Agent, or Firm* — Leydig, Voit & Mayer, Ltd.

(57) ABSTRACT

The present invention provides a refrigerating machine oil comprising a polyvinylether having a structural unit represented by the following formula (1):

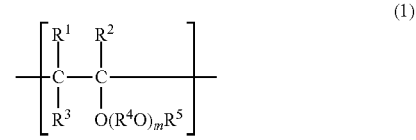

wherein $R^1$, $R^2$, and $R^3$ may be the same or different from each other and each represent a hydrogen atom or a hydrocarbon group, $R^4$ represents a divalent hydrocarbon group or an ethereal oxygen-containing divalent hydrocarbon group, $R^5$ represents a hydrocarbon group, m represents an integer of 0 or more, and in the case where m is 2 or more, a plurality of $R^4$ may be the same or different from each other, a number average molecular weight Mn is 500 or more and 2000 or less, a ratio of a weight average molecular weight Mw to a number average molecular weight Mn, Mw/Mn, is 1.10 or more and 1.25 or less, and the refrigerating machine oil is used with a mildly flammable hydrofluorocarbon refrigerant.

18 Claims, 1 Drawing Sheet

(56) References Cited

FOREIGN PATENT DOCUMENTS

| JP | 2009-052050 A | 3/2009 | | |
|----|---------------|--------|---|---|
| JP | 2009-191211 A | 8/2009 | | |
| JP | 2011-202032 A | 10/2011 | | |
| JP | 2012-072273 A | 4/2012 | | |
| JP | 2013-014673 A | 1/2013 | | |
| JP | 5666052 B1 | 2/2015 | | |
| WO | WO-2013146683 A1 * | 10/2013 | ............ | C09K 5/045 |

OTHER PUBLICATIONS

Japanese Patent Office, Office Action issued in Japanese Application No. P2014-153733 (dated Sep. 16, 2014).
"GPC-ho(SEC-ho) Nyumon Koza", TOSOH Analysis and Research Center Col, Ltd., 1 pp. (2013).

* cited by examiner

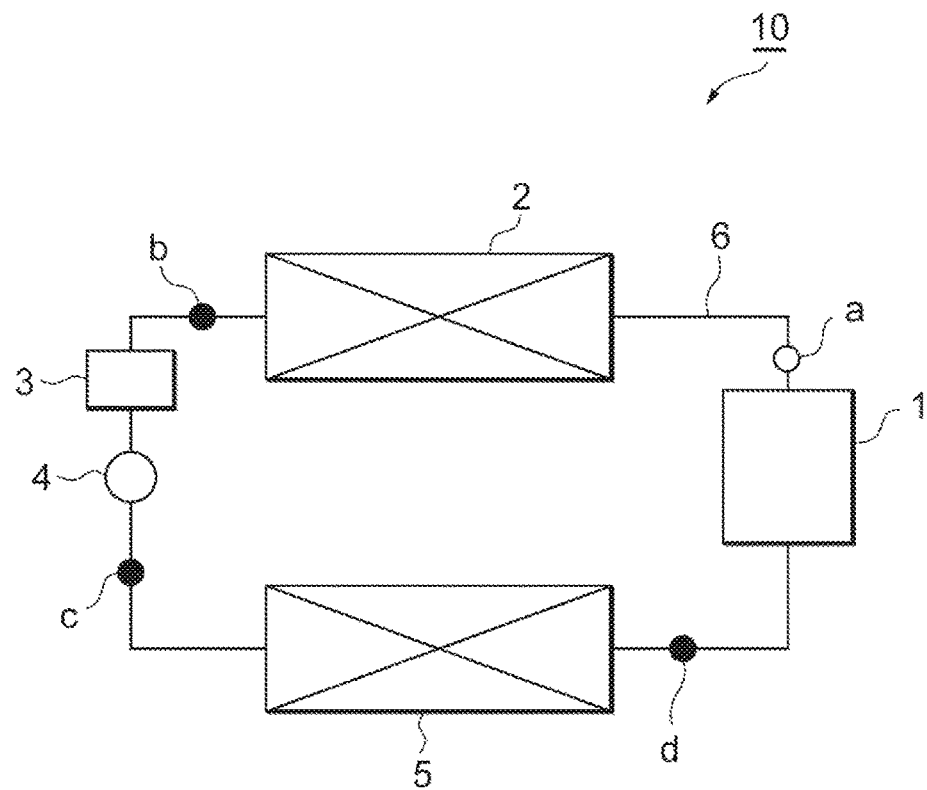

REFRIGERATOR OIL, AND WORKING FLUID COMPOSITION FOR REFRIGERATORS

CROSS-REFERENCE TO RELATED APPLICATIONS

This patent application is the U.S. national phase of International Application No. PCT/JP2015/052860, filed on Feb. 2, 2015, which claims the benefit of Japanese Patent Application No. 2014-020502, filed Feb. 5, 2014, the disclosures of which are incorporated herein by reference in their entireties for all purposes.

TECHNICAL FIELD

The present invention relates to a refrigerating machine oil, a working fluid composition for a refrigerating machine, use of a composition containing a polyvinylether for a refrigerating machine oil or a working fluid composition for a refrigerating machine, and use of a polyvinylether for manufacturing a refrigerating machine oil or a working fluid composition for a refrigerating machine, and a method of flame-retarding a refrigerating machine.

BACKGROUND ART

CFCs (chlorofluorocarbons) and HCFCs (hydrochlorofluorocarbons), which have been conventionally used as refrigerants for refrigeration equipment, have become objects of regulations due to the problem of recent ozone layer depletion, and HFCs (hydrofluorocarbons) are used as refrigerants instead of them.

In the case of using a CFC or HCFC as a refrigerant, hydrocarbon oils such as mineral oil and alkylbenzenes have been used suitably as a refrigerating machine oil. However, depending on the type of the coexistent refrigerant, the refrigerating machine oil may exhibit unpredictable behavior in, for example, compatibility with the refrigerant, lubricity, solution viscosity with the refrigerant, and thermal and chemical stability, and therefore the refrigerating machine oil needs to be developed for each refrigerant. Thus, as refrigerating machine oils for an HFC refrigerant, for example, a refrigerating machine oil containing polyalkylene glycol (see Patent Literature 1), ester (see Patent Literature 2), carbonic acid ester (see Patent Literature 3), or polyvinylether (see Patent Literature 4) have been developed.

CITATION LIST

Patent Literature

Patent Literature 1: Japanese unexamined Patent Publication No. H02-242888
Patent Literature 2: Japanese unexamined Patent Publication No. H03-200895
Patent Literature 3: Japanese unexamined Patent Publication No. H03-217495
Patent Literature 4: Japanese unexamined Patent Publication No. H06-128578

SUMMARY OF INVENTION

Technical Problem

It is an object of the present invention to provide a refrigerating machine oil of which safety has been enhanced from the viewpoint of flame retardancy and a working fluid composition for a refrigerating machine containing the refrigerating machine oil.

Solution to Problem

To solve the above described problem, the present invention provides a refrigerating machine oil comprising a polyvinylether having a structural unit represented by the following formula (1):

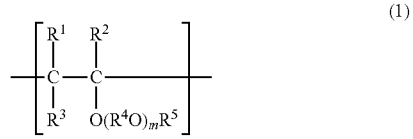

wherein $R^1$, $R^2$, and $R^3$ may be the same or different from each other and each represent a hydrogen atom or a hydrocarbon group, $R^4$ represents a divalent hydrocarbon group or an ethereal oxygen-containing divalent hydrocarbon group, $R^5$ represents a hydrocarbon group, m represents an integer of 0 or more, and in the case where m is 2 or more, a plurality of $R^4$ may be the same or different from each other, a number average molecular weight Mn of the polyvinylether is 500 or more and 2000 or less, a ratio of a weight average molecular weight Mw to a number average molecular weight Mn, Mw/Mn, of the polyvinylether is 1.10 or more and 1.25 or less, and the refrigerating machine oil is used with a mildly flammable hydrofluorocarbon refrigerant.

Also, the present invention provides a working fluid composition for a refrigerating machine, comprising: the above refrigerating machine oil; and a mildly flammable hydrofluorocarbon refrigerant.

In the present invention, the mildly flammable hydrofluorocarbon refrigerant may contain at least one selected from the group consisting of difluoromethane, 1,3,3,3-tetrafluoropropene, and 2,3,3,3-tetrafluoropropene.

It may also be said that the present invention is use of a composition for a refrigerating machine oil or a working fluid composition for a refrigerating machine, the composition comprising a polyvinylether having a structural unit represented by the following formula (1):

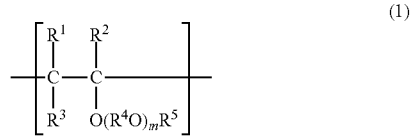

wherein $R^1$, $R^2$, and $R^3$ may be the same or different from each other and each represent a hydrogen atom or a hydrocarbon group, $R^4$ represents a divalent hydrocarbon group or an ethereal oxygen-containing divalent hydrocarbon group, $R^5$ represents a hydrocarbon group, m represents an integer of 0 or more, and in the case where m is 2 or more, a plurality of $R^4$ may be the same or different from each other, a number average molecular weight Mn of the polyvinylether is 500 or more and 2000 or less, a ratio of a weight average molecular weight Mw to a number average molecular weight Mn, Mw/Mn, of the polyvinylether is 1.10 or more and 1.25 or less, the refrigerating machine oil is used with a mildly flammable hydrofluorocarbon refrigerant, and the working fluid composition for a refrigerating machine comprises the refrigerating machine oil and the mildly flammable hydrofluorocarbon refrigerant.

Also, it may also be said that the present invention is use of a composition for manufacturing a refrigerating machine oil or a working fluid composition for a refrigerating machine, the composition comprising a polyvinylether having a structural unit represented by a following formula (1):

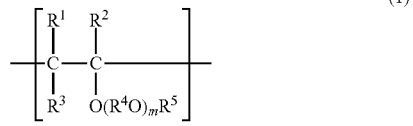

wherein $R^1$, $R^2$, and $R^3$ may be the same or different from each other and each represent a hydrogen atom or a hydrocarbon group, $R^4$ represents a divalent hydrocarbon group or an ethereal oxygen-containing divalent hydrocarbon group, $R^5$ represents a hydrocarbon group, m represents an integer of 0 or more, and in the case where m is 2 or more, a plurality of $R^4$ may be the same or different from each other, a number average molecular weight Mn of the polyvinylether is 500 or more and 2000 or less, a ratio of a weight average molecular weight Mw to the number average molecular weight Mn, Mw/Mn, of the polyvinylether is 1.10 or more and 1.25 or less, the refrigerating machine oil is used with a mildly flammable hydrofluorocarbon refrigerant, and the working fluid composition for a refrigerating machine comprises the refrigerating machine oil and the mildly flammable hydrofluorocarbon refrigerant.

The present invention also provides a method of flame-retarding a refrigerating machine in which a mildly flammable hydrofluorocarbon refrigerant is used, the method comprising using, as a refrigerating machine oil, a composition comprising a polyvinylether having a structural unit represented by a following formula (1):

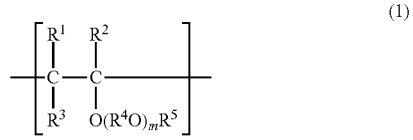

wherein $R^1$, $R^2$, and $R^3$ may be the same or different from each other and each represent a hydrogen atom or a hydrocarbon group, $R^4$ represents a divalent hydrocarbon group or an ethereal oxygen-containing divalent hydrocarbon group, $R^5$ represents a hydrocarbon group, m represents an integer of 0 or more, and in the case where m is 2 or more, a plurality of $R^4$ may be the same or different from each other, a number average molecular weight Mn of the polyvinylether is 500 or more and 2000 or less, and a ratio of a weight average molecular weight Mw to the number average molecular weight Mn, Mw/Mn, of the polyvinylether is 1.10 or more and 1.25 or less.

Advantageous Effects of Invention

According to the present invention, it becomes possible to provide a refrigerating machine oil of which safety has been enhanced from the viewpoint of flame retardancy and a working fluid composition for refrigerating machines containing the refrigerating machine oil.

BRIEF DESCRIPTION OF DRAWINGS

FIG. 1 is a schematic view showing an example of the configuration of a refrigerating machine.

DESCRIPTION OF EMBODIMENTS

Hereinbelow, preferred embodiments of the present invention will be described in detail.

A refrigerating machine oil according to the present embodiment comprises a polyvinylether which has a structural unit represented by the following formula (1):

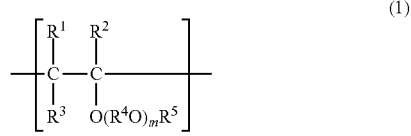

wherein $R^1$, $R^2$, and $R^3$ may be the same or different from each other and each represent a hydrogen atom or a hydrocarbon group, $R^4$ represents a divalent hydrocarbon group or an ethereal oxygen-containing divalent hydrocarbon group, $R^5$ represents a hydrocarbon group, m represents an integer of 0 or more, and in the case where m is 2 or more, a plurality of $R^4$ may be the same or different from each other, the number average molecular weight Mn of the polyvinylether being 500 or more and 2000 or less, and the ratio of the weight average molecular weight Mw to the number average molecular weight Mn, Mw/Mn, of the polyvinylether being 1.10 or more and 1.25 or less. $R^1$ to $R^5$ and m each may be the same or different, depending on the structural units constituting the polyvinylether.

The working fluid composition for refrigerating machines according to the present embodiment contains a refrigerating machine oil containing a polyvinylether and a mildly flammable hydrofluorocarbon refrigerant, the polyvinylether having a structural unit represented by the above formula (1), the number average molecular weight Mn of 500 or more and 2000 or less, and the ratio of the weight average molecular weight Mw to the number average molecular weight Mn, Mw/Mn, of 1.10 or more and 1.25 or less. The working fluid composition for refrigerating machines according to the present embodiment encompasses a composition comprising a refrigerating machine oil according to the present embodiment and a mildly flammable hydrofluorocarbon refrigerant.

The number of carbon atoms of the hydrocarbon groups represented by $R^1$, $R^2$, and $R^3$ in the formula (1) is preferably 1 or more, more preferably 2 or more, still more preferably 3 or more, and preferably 8 or less, more preferably 7 or less, still more preferably 6 or less. It is preferred that at least one of $R^2$, and $R^3$ in the formula (1) be a hydrogen atom, and it is more preferred that the all be hydrogen atoms.

The number of carbon atoms of the divalent hydrocarbon group or the ethereal oxygen-containing divalent hydrocarbon group represented by $R^4$ in the formula (1) is preferably 1 or more, more preferably 2 or more, still more preferably 3 or more, and preferably 10 or less, more preferably 8 or less, still more preferably 6 or less. The ethereal oxygen-containing divalent hydrocarbon group represented by $R^4$ in the formula (1) may be, for example, a hydrocarbon group having oxygen atom forming an ether bond in the side chain.

It is preferred that $R^5$ in the formula (1) be a hydrocarbon group having 1 to 20 carbon atoms. Examples of this hydrocarbon group include alkyl groups, cycloalkyl groups, phenyl groups, aryl groups, and arylalkyl groups. Of these, alkyl groups are preferred, and alkyl groups having 1 to 5 carbon atoms are more preferred.

m in the formula (1) is preferably an integer of 0 or more, more preferably an integer of 1 or more, still more preferably an integer of 2 or more, and preferably an integer of 20 or less, more preferably an integer of 18 or less, still more preferably an integer of 16 or less. It is preferred that the average value of m in all the structural units constituting the polyvinylether be 0 to 10.

Polyvinylether may be a homopolymer composed of a single structural unit selected from those represented by the formula (1), may be a copolymer composed of two or more structural units selected from those represented by the formula (1), or may be a copolymer composed of a structural unit represented by the formula (1) and other structural unit. By using a copolymer as the polyvinylether, it is possible to further improved the lubricity, insulation property, hygroscopicity and the like while the compatibility with the refrigerant of the refrigerating machine oil is satisfied. In this case, desired properties of the above refrigerating machine oil can be obtained by selecting the type of the raw material monomers, the type of the initiator, the ratio of the structural unit in the copolymer and the like as appropriate. Accordingly, it is possible to freely obtain a refrigerating machine oil in conformity with demands for lubricity, compatibility, or the like which vary depending upon the model of the compressor, the material quality of the lubricating part, the refrigeration capability, the type of refrigerant and the like in a refrigerating system or an air conditioning system. The copolymer may be either of a block copolymer or a random copolymer.

When the polyvinylether is a copolymer, it is preferred that the copolymer contain a structural unit (1-1), which is represented by the above formula (1) and in which $R^5$ is an alkyl group having 1 to 3 carbon atoms, and a structural unit (1-2), which is represented by the above formula (1) and in which $R^5$ is an alkyl group having 4 to 20 carbon atoms, preferably 4 to 10 carbon atoms, more preferably 4 to 8 carbon atoms. As $R^5$ in the structural unit (1-1), an ethyl group is particularly preferred, and as $R^5$ in the structural unit (1-2), an isobutyl group is particularly preferred. Additionally, when the polyvinylether according to the present embodiment is a copolymer containing the above structural unit (1-1) and (1-2), it is preferred that the molar ratio between the structural unit (1-1) and the structural unit (1-2) be 5:95 to 95:5, it is more preferred that the molar ratio be 20:80 to 90:10, and it is still more preferred that the molar ratio be 70:30 to 90:10. If the molar ratio is within the above range, it tends to be possible to further enhance the compatibility with a refrigerant and to lower the hygroscopicity.

The polyvinylether according to the present embodiment may be one composed singly of a structural unit represented by the above formula (1), but may be a copolymer further comprising a structural unit represented by the following formula (2). In this case, the copolymer may be either of a block copolymer or a random copolymer.

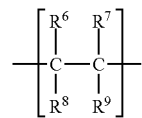
(2)

In the formula, $R^6$ to $R^9$ may be the same or different from each other and each represent a hydrogen atom or a hydrocarbon group having 1 to 20 carbon atoms.

The polyvinylether can produced by polymerization of a vinylether monomer corresponding to a structural unit represented by the formula (1), or copolymerization of a vinylether monomer corresponding to a structural unit represented by the formula (1) and a hydrocarbon monomer having an olefinic double bond corresponding to a structural unit represented by formula (2). As the vinylether monomer corresponding to a structural unit represented by the formula (1), monomers represented by the following formula (3) are suitable.

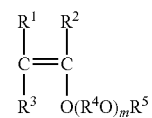
(3)

In the formula, $R^1$, $R^2$, $R^3$, $R^4$, $R^5$, and m each represent the same definition as $R^1$, $R^2$, $R^3$, $R^4$, $R^5$, and m in the formula (1).

As the polyvinylether, those having the following terminal structure (A) or (B) are suitable:

(A) A structure in which one terminus is represented by the formula (4) or (5), and the other terminus is represented by the formula (6) or (7).

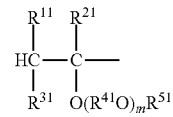
(4)

In the formula, $R^{11}$, $R^{21}$, and $R^{31}$ may be the same or different from each other and each represent a hydrogen atom or a hydrocarbon group having 1 to 8 carbon atoms, $R^{41}$ represents a divalent hydrocarbon group or ethereal oxygen-containing divalent hydrocarbon group having 1 to 10 carbon atoms, $R^{51}$ represents a hydrocarbon group having 1 to 20 carbon atoms, and m represents the same definition as m in the formula (1), and in the case where m is 2 or more, a plurality of $R^{41}$ may be the same or different from each other.

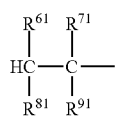
(5)

In the formula, $R^{61}$, $R^{71}$, $R^{81}$, and $R^{91}$ may be the same or different from each other and each represent a hydrogen atom or a hydrocarbon group having 1 to 20 carbon atoms.

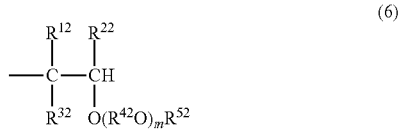

(6)

In the formula, $R^{12}$, $R^{22}$, and $R^{32}$ may be the same or different from each other and each represent a hydrogen atom or a hydrocarbon group having 1 to 8 carbon atoms, $R^{42}$ represents a divalent hydrocarbon group or ethereal oxygen-containing divalent hydrocarbon group having 1 to 10 carbon atoms, $R^{52}$ represents a hydrocarbon group having 1 to 20 carbon atoms, and m represents the same definition as m in the formula (1), and in the case where m is 2 or more, a plurality of $R^{41}$ may be the same or different.

(7)

In the formula, $R^{62}$, $R^{72}$, $R^{82}$, and $R^{92}$ may be the same or different from each other and each represent a hydrogen atom or a hydrocarbon group having 1 to 20 carbon atoms.

(B) A structure in which one terminus is represented by the formula (4) or (5), and the other terminus is represented by the formula (8).

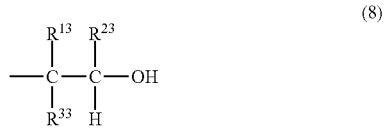

(8)

In the formula, $R^{13}$, $R^{23}$, and $R^{33}$ may be the same or different from each other and each represent a hydrogen atom or a hydrocarbon group having 1 to 8 carbon atoms.

Of such polyvinylethers, polyvinylethers (a), (b), (c), (d), and (e) listed below are particularly preferred as the main component of the refrigerating machine oil according to the present embodiment:

(a) Polyvinylethers having a structure in which one terminus is represented by the formula (4) or (5) and the other terminus is represented by the formula (6) or (7), wherein in the formula (1), $R^1$, $R^2$, and $R^3$ are each a hydrogen atom, m is an integer of 0 to 4, $R^4$ is a divalent hydrocarbon group having 2 to 4 carbon atoms, and $R^5$ is a hydrocarbon group having 1 to 20 carbon atoms.

(b) Polyvinylethers having only a structural unit represented by the formula (1), in which one terminus is represented by the formula (4) and the other terminus is represented by the formula (6), wherein in the formula (1), $R^1$, $R^2$ and $R^3$ are each a hydrogen atom, m is an integer of 0 to 4, $R^4$ is a divalent hydrocarbon group having 2 to 4 carbon atoms, and $R^5$ is hydrocarbon group having 1 to 20 carbon atoms.

(c) Polyvinylethers having a structure in which one terminus is represented by the formula (4) or (5) and the other terminus is represented by the formula (8), wherein in the formula (1), $R^1$, $R^2$, and $R^3$ are each a hydrogen atom, m is an integer of 0 to 4, $R^4$ is a divalent hydrocarbon group having 2 to 4 carbon atoms, and $R^5$ is a hydrocarbon group having 1 to 20 carbon atoms.

(d) Polyvinylethers having only a structural unit represented by the formula (1), in which one terminus is represented by the formula (5) and the other terminus is represented by the formula (8), wherein in the formula (1), $R^1$, $R^2$ and $R^3$ are each a hydrogen atom, m is an integer of 0 to 4, $R^4$ is a divalent hydrocarbon group having 2 to 4 carbon atoms, and $R^5$ is hydrocarbon group having 1 to 20 carbon atoms.

(e) Any one of the above (a), (b), (c), and (d) having a structural unit in which $R^5$ in the formula (1) is a hydrocarbon group having 1 to 3 carbon atoms and a structural unit in which $R^5$ in the formula (1) is a hydrocarbon group having 4 to 20 carbon atoms.

The number average molecular weight (Mn) of the polyvinylether is preferably 500 or more, more preferably 700 or more, still more preferably 800 or more, particularly preferably 900 or more, most preferably 1000 or more, and preferably 2000 or less, more preferably 1900 or less, still more preferably 1500 or less. In the case where the number average molecular weight of the polyvinylether is 500 or more, the lubricity is increased under coexistence of a mildly flammable hydrofluorocarbon refrigerant. In the case where the number average molecular weight of the polyvinylether is 2000 or less, the range of the composition which exhibits compatibility to the mildly flammable hydrofluorocarbon refrigerant becomes wider under low temperature conditions, and it is possible to suppress lubrication defects of a refrigerant compressor and inhibition of heat exchange in an evaporator.

The ratio of the weight average molecular weight (Mw) to the number average molecular weight (Mn), (Mw/Mn) of the polyvinylether is preferably 1.10 or more, more preferably 1.15 or more, still more preferably 1.16 or more, particularly preferably 1.17 or more, and preferably 1.25 or less, more preferably 1.23 or less, still more preferably 1.22 or less particularly preferably 1.21 or less. If Mw/Mn is 1.10 or more, the range of the composition which exhibits compatibility to the mildly flammable hydrofluorocarbon becomes wider. If Mw/Mn is 1.25 or less, it is possible to suppress lubrication defects of a refrigerant compressor and inhibition of heat exchange in an evaporator. The weight average molecular weight (Mw) of the polyvinylether is selected as appropriate such that Mn and Mw/Mn satisfy the above conditions.

The weight average molecular weight (Mw), the number average molecular weight (Mn), and the ratio of the weight average molecular weight (Mw) to the number average molecular weight (Mn) (Mw/Mn) in the present invention mean Mw, Mn, and Mw/Mn obtained by GPC analysis (values in terms of polystyrene (standard sample)), respectively. Mw, Mn, and Mw/Mn are measured as follows, for example.

Chloroform is used as the solvent, and polyvinylether is diluted to thereby prepare a solution of which sample concentration is 1% by mass. The solution is analyzed by using a GPC apparatus (Waters Alliance 2695). Analysis is conducted at a solvent flow rate of 1 ml/min by using a column of which analyzable molecular weight is from 100 to 10000 with a refractive index detector. It should be noted that, after the relationship between the column retention time and the molecular weight is determined by using a polystyrene standard of which molecular weight is obvious to thereby form a calibration curve separately, the molecular weight is determined from the obtained retention time.

It is preferred that the flash point of the polyvinylether be 195° C. or more, it is more preferred that the flash point be 200° C. or more, and it is still more preferred that the flash point be 205° C. or more. The flash point in the present invention means the flash point measured in compliance with JIS K2265-4 "Determination of flash points—Part 4: Cleveland open cup method".

It is preferred that the autoignition point of the polyvinylether be 335° C. or more, it is more preferred that the autoignition point is 340° C. or more, and it is still more preferred that the autoignition point is 345° C. or more. The autoignition point in the present invention means an autoignition point measured in compliance with ASTM E659-1978.

The kinematic viscosity of the polyvinylether at 100° C. is preferably 6.5 mm$^2$/s or more, more preferably 7.0 mm$^2$/s or more, still more preferably 7.5 mm$^2$/s or more, and preferably 9.5 mm$^2$/s or less, more preferably 9.0 mm$^2$/s or less, still more preferably 8.5 mm$^2$/s or less. If the kinematic viscosity at 100° C. is the lower limit above-mentioned or more, the lubricity is increased under coexistence of a refrigerant. If the kinematic viscosity at 100° C. is the lower limit above-mentioned or less, the range of the composition which exhibits compatibility to the refrigerant becomes wider and it is possible to suppress poor lubrication of a refrigerant compressor and inhibition of heat exchange in an evaporator.

The kinematic viscosity of the polyvinylether at 40° C. is preferably 50 mm$^2$/s or more, more preferably 55 mm$^2$/s or more, still more preferably 60 mm$^2$/s or more, and preferably 80 mm$^2$/s or less, more preferably 75 mm$^2$/s or less, still more preferably 70 mm$^2$/s or less. If the kinematic viscosity at 40° C. is the lower limit above-mentioned or more, the lubricity and the sealability of the compressor tend to increase. If the kinematic viscosity at 40° C. is the lower limit above-mentioned or less, the range of the composition which exhibits compatibility to the refrigerant under low temperature conditions becomes wider and it is possible to suppress poor lubrication of a refrigerant compressor and inhibition of heat exchange in an evaporator.

The viscosity index of the polyvinylether is preferably 50 or more, more preferably 60 or more, still more preferably 70 or more, and preferably 120 or less, more preferably 100 or less, still more preferably 80 or less. If the viscosity index is the lower limit above-mentioned or more, the lubricity of the refrigerating machine oil on sliding portions is maintained. If the viscosity index is the upper limit above-mentioned or less, energy loss caused by the resistance between the refrigerating machine oil at a high temperature and the piping becomes smaller.

The kinematic viscosity and viscosity index in the present invention means the kinematic viscosity specified in JIS K2283-1993.

The pour point of the polyvinylether is preferably −10° C. or less, more preferably −20° C. or less, and preferably −50° C. or more. If a polyvinylether of which the pour point is −10° C. or less is used, it tends to prevent the refrigerating machine oil in a refrigerant circulation system from solidifying at low temperatures. The pour point in the present invention means the pour point specified in JIS K2269.

Polyvinylethers can be produced by radical polymerization, cation polymerization, radiation polymerization or the like of the aforementioned monomers. By providing a routine separation/purification process after the polymerization reaction is finished, the intended polyvinylether having the structural unit represented by the formula (1) can be obtained.

In the production step of the polyvinylether, there is a case where a side reaction is caused to thereby form an unsaturated group such as an aryl group in the molecule. From the viewpoints of increases in the thermal stability of the polyvinylether itself, inhibition of formation of sludge caused by formation of a polymerized product, and inhibition of formation of a peroxide due to decreases in the anti-oxidative property (oxidation prevention property), it is preferred to use a polyvinylether having a low degree of unsaturation due to an unsaturated group and the like as the polyvinylether. It is preferred that the degree of unsaturation of the polyvinylether be 0.04 meq/g or less, it is more preferred that the degree of unsaturation be 0.03 meq/g or less, and it is still more preferred that the degree of unsaturation be 0.02 meq/g or less. It is preferred that the peroxide value of the polyvinylether be 10.0 meq/kg or less, it is more preferred that the peroxide value be 5.0 meq/kg or less, and it is still more preferred that the peroxide value be 1.0 meq/kg. It is preferred that the carbonyl value of the polyvinylether be 100 ppm by weight or less, it is more preferred that the carbonyl value be 50 ppm by weight or less, and it is further preferred that the carbonyl value be 20 ppm by weight or less. It is preferred that the hydroxy value of the polyvinylether be 10 mgKOH/g or less, it is more preferred that the hydroxy value be 5 mgKOH/g or less, and it is still more preferred that the hydroxy value be 3 mgKOH/g or less.

The degree of unsaturation, peroxide value and carbonyl value in the invention are the values measured each in accordance with the Standard Methods for the Analysis of Fats, Oils and Related Materials, established by the Japan Oil Chemists' Society. That is, the degree of unsaturation in the present invention is a value (meq/g) obtained by reacting a Wijs solution (ICl-acetic acid solution) with a sample, leaving the reaction mixture to stand in a dark place, subsequently reducing the excess ICl to iodine, titrating the iodine portion with sodium thiosulfate to calculate the iodine value, and then converting the iodine value to vinyl equivalents (meq/g). The peroxide value in the present invention is a value (meq/kg) obtained by adding potassium iodide to a sample, titrating the produced free iodine with sodium thiosulfate, and converting the free iodine to milliequivalents with respect to 1 kg of sample. The carbonyl value in the present invention is a value (ppm by weight) obtained by allowing 2,4-dinitrophenylhydrazine to act on a sample to produce colorable quinoid ions, measuring the absorbance of the sample at 480 nm, and converting it to a carbonyl content based on a predetermined calibration curve with cinnamaldehyde as the standard substance. The hydroxy value in the present invention means the hydroxy value measured in compliance with JIS K0070:1992.

Although a refrigerating machine oil can increase the safety for the refrigerating machine oil and a working fluid composition for refrigerating machines containing the refrigerating machine oil from the viewpoint of flame retardancy even in the case where the refrigerating machine oil contains only the above polyvinylether, the refrigerating machine oil may contain a base oil described below other than the above polyvinylether and additives as required.

The content of the above described polyvinylether in the refrigerating machine oil is not particularly limited provided that the above described excellent properties are not impaired, but, based on the total amount of the refrigerating machine oil, it is preferred the content be 50% by mass or more, it is more preferred that the content be 70% by mass or more, it is still more preferred that the content be 80% by mass or more, and it is particularly preferred that the content be 90% by mass or more. If the content of the above described polyvinylether is 50% by mass or more, it is possible to further increase the safety of the refrigerating machine oil and the working fluid composition for refrigerating machines containing the refrigerating machine oil.

As a base oil other than the above described polyvinylether, it is possible to use hydrocarbon oils, such as mineral oils, olefin polymers, naphthalene compounds, and alkylbenzenes, and ester base oils (such as monoesters, diesters, and polyol esters), and synthetic oils composed of a compound having oxygen atoms such as polyalkylene glycols, polyvinylethers other than the above described polyvinylethers, ketones, polyphenyl ethers, silicones, polysiloxanes and perfluoroethers. As the synthetic oil composed of a compound having oxygen atom, polyol esters and polyalkylene glycols are preferably used.

The refrigerating machine oil and the working fluid composition for refrigerating machines of the present embodiment can comprise conventionally-known additives for refrigerating machine oil as required, in order to further enhance their performance. Examples of such additives include antioxidants, acid scavengers, antiwear agents, extreme pressure agents, oiliness agents, antifoaming agents, metal deactivators, viscosity index improvers, pour point depressant, and detergent dispersants. One of these additives may be used singly, or two or more of these additives may be used in combination. The content of these additives is not particularly limited, but it is preferably 10% by mass or less and further preferably 5% by mass or less, based on the total amount of the refrigerating machine oil.

The kinematic viscosity of the refrigerating machine oil at 40° C. is not particularly limited, but is preferably 3 $mm^2/s$ or more, more preferably 4 $mm^2/s$ or more, still more preferably 5 $mm^2/s$ or more, and preferably 1000 $mm^2/s$ or less, more preferably 500 $mm^2/s$ or less, still more preferably 400 $mm^2/s$ or less. The kinematic viscosity of the refrigerating machine oil at 100° C. is not particularly limited, but is preferably 1 $mm^2/s$ or more, more preferably 2 $mm^2/s$ or more, still more preferably 3 $mm^2/s$ or more, and preferably 100 $mm^2/s$ or less, more preferably 50 $mm^2/s$ or less, still more preferably 30 $mm^2/s$ or less.

The moisture content of the refrigerating machine oil is not particularly limited, but it is preferably 500 ppm or less, further preferably 300 ppm or less, and more preferably 200 ppm or less, based on the total amount of the refrigerating machine oil. Particularly, in the case of being used for a hermetic refrigerating machine, it is required that the moisture content be low, from the viewpoint of the influence on thermal/chemical stability and the electrical insulation property of the refrigerating machine oil.

The acid value of the refrigerating machine oil is not particularly limited, but it is preferably 0.1 mgKOH/g or less and further preferably 0.05 mgKOH/g or less, in order to prevent corrosion of the metal used in a refrigerating machine or piping, and to prevent degradation of the ester contained in the refrigerating machine oil of the present embodiment. The acid value in the present invention means the acid value measured in compliance with JIS K2501 "Petroleum Products And Lubricating Oils-Neutralization Value Test Method".

The ash content of the refrigerating machine oil is not particularly limited, but it is preferably 100 ppm or less and further preferably 50 ppm or less, in order to increase the thermal/chemical stability of the refrigerating machine oil and to suppress the occurrence of sludge or the like. The ash content in the present invention means the ash content measured in compliance with JIS K2272 "Crude oil/petroleum product ash content and sulfated ash content test method".

The refrigerating machine oil is used with a mildly flammable hydrofluorocarbon (HFC) refrigerant. The working fluid composition for refrigerating machines contains a mildly flammable hydrofluorocarbon (HFC) refrigerant. In the hydrofluorocarbon (HFC) refrigerants, saturated fluorinated hydrocarbon refrigerants (also referred to as hydrofluoroalkane refrigerants) and unsaturated fluorinated hydrocarbon refrigerants (also referred to as hydrofluoroalkene refrigerants, hydrofluoroolefin refrigerants, or BYO refrigerants) are included. The mildly flammable refrigerant in the present invention means refrigerants included in the A2L classification in the flammability classification of ASHRAE (The American Society of Heating, Refrigerating and Air-conditioning Engineers).

Examples of the mildly flammable hydrofluorocarbon refrigerant include difluoromethane (HFC-32), 1,3,3,3-tetrafluoropropene (HFC-1234ze), and 2,3,3,3-tetrafluoropropene (HFC-1234yf). As the mildly flammable hydrofluorocarbon refrigerant, 1,3,3,3-tetrafluoropropene (HFC-1234ze) or 2,3,3,3-tetrafluoropropene (HFC-1234yf) is preferred.

The refrigerant used with the refrigerating machine oil may be a mixed refrigerant of a mildly flammable hydrofluorocarbon refrigerant and other refrigerant. Examples of other refrigerants include hydrofluorocarbon refrigerants other than mildly flammable hydrofluorocarbon refrigerants, fluorine-containing ether-based refrigerants such as perfluoroethers, bis(trifluoromethyl)sulfide refrigerants, trifluoromethyl iodide refrigerants, and natural refrigerant, such as dimethylether, carbon dioxide, ammonia, and hydrocarbons. As other refrigerants, refrigerants composed of a compound which does not have an oxygen atom are preferably used.

Examples of hydrofluorocarbon refrigerant other than the mildly flammable hydrofluorocarbon refrigerant include trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), 1,1,1,3,3-pentafluorobutane (HFC-365mfc), and 1,2,3,3,3-pentafluoropropene (HFC-1225ye).

As the hydrocarbon refrigerant, hydrocarbons having 3 to 5 carbon atoms are preferred, and specifically, examples include methane, ethylene, ethane, propylene, propane, cyclopropane, normal butane, isobutane, cyclobutane, methylcyclopropane, 2-methylbutane, normal pentane, or mixtures of two or more of these. Of these, those which are gaseous at 25° C. and 1 atmosphere are preferably used, and propane, normal butane, isobutane, 2-methylbutane or a mixture of these is preferred.

Examples of the fluorine-containing ether-based refrigerant specifically include HFE-134p, HFE-245mc, HFE-236mf, HFE-236me, HFE-338mcf, HFE-365mcf, HFE-245mf, HFE-347mmy, HFE-347mcc, HFE-125, HFE-143m, HFE-134m, and HFE-227me, and these refrigerants are selected as appropriate depending on uses and required performance.

In the case where the refrigerant is a mixed refrigerant, it is preferred that the mixing ratio between the mildly flammable hydrofluorocarbon refrigerant and other refrigerant (mass ratio, mildly flammable hydrofluorocarbon refrigerant:other refrigerant) be 1:99 to 99:1, and it is more preferred that the mixing ratio be 5:95 to 95:5.

The refrigerating machine oil is, usually in a refrigerating or air conditioning apparatus, mixed with a single mildly flammable hydrofluorocarbon refrigerant or a mixed refrigerant and present as a component of a working fluid composition for refrigerating machines. The content of the refrigeration oil in the working fluid composition for refrigerating machines is preferably 1 part by mass or more, more preferably 2 parts by mass or more, and preferably 500 parts by mass or less, more preferably 400 parts by mass or less, based on 100 parts by mass of the refrigerant.

The refrigerating machine oil and the working fluid composition for refrigerating machines are preferably used in air conditioners or refrigerating machines having a reciprocating or rotating closed compressor, or in open or closed automobile air conditioners. The refrigeration oil and the working fluid composition for a refrigerating machine are preferably used in dehumidifiers, hot water suppliers, cooling apparatuses, such as freezers, freezing-refrigerating warehouses, vending machines, showcases, and chemical plants. The refrigeration oil and the working fluid composition for a refrigerating machine are also preferably used in those having a centrifugal compressor.

FIG. 1 is a schematic view showing an example of the configuration of the refrigerating machine described above. As shown in FIG. 1, a refrigerating machine 10 comprises a refrigerant circulation system in which at least a compressor 1, a condenser 2, an expansion mechanism 4, and an evaporator 5 are successively connected by a passage 6. The refrigerant circulation system may further comprise a desiccator 3.

In the compressor 1, a small amount of the mildly flammable hydrofluorocarbon refrigerant (hereinbelow, also simply referred to as "refrigerant") and a large amount of the refrigerating machine oil coexist under a high temperature (usually 70 to 120° C.) condition. The refrigerant released from the compressor 1 to the passage 6 is gaseous and contains a small amount of (usually 1 to 10%) the refrigerating machine oil in the form of a mist. In this refrigerating machine oil mist, a small amount of the refrigerant is dissolved (point a in FIG. 1). Next, in the condenser 2, the gaseous refrigerant is compressed to be a high-density fluid, and under a relatively high temperature (usually 50 to around 70° C.) condition, a large amount of the refrigerant and a small amount of the refrigerating machine oil coexist (point b in FIG. 1). Furthermore, the mixture of a large amount of the refrigerant and a small amount of the refrigerating machine oil is successively supplied to the desiccator 3, the expansion mechanism 4, and the evaporator 5 to rapidly have a lower temperature (usually −40 to 0° C.) (points c and d in FIG. 1) and be returned back to the refrigerant compressor 1.

By using the polyvinylether of the present embodiment as the refrigerating machine oil, it becomes possible to flame-retard the refrigerating machines in which a mildly flammable hydrofluorocarbon refrigerant as mentioned above is used.

EXAMPLES

Hereinbelow, the present invention will be described more specifically based on examples and comparative examples, but the present invention is not limited in any way by the examples below.

Examples 1 to 5 and Comparative Examples 1 to 5

In Examples 1 to 5 and Comparative Examples 1 to 5, base oils 1 to 10 shown below were each used to prepare a refrigerating machine oil.

(Base Oil)

Base Oil 1:
Copolymer of ethylvinylether and isobutylvinylether [ethylvinylether/isobutylvinylether=8/2 (molar ratio), number average molecular weight (Mn): 500, ratio of the weight average molecular weight (Mw) to the number average molecular weight (Mn) (Mw/Mn): 1.25, kinematic viscosity at 40° C.: 50.2 mm$^2$/s, kinematic viscosity at 100° C.: 6.90 mm$^2$/s, viscosity index: 91]

Base Oil 2:
Copolymer of ethylvinylether and isobutylvinylether [ethylvinylether/isobutylvinylether=9/1 (molar ratio), number average molecular weight (Mn): 1200, ratio of the weight average molecular weight (Mw) to the number average molecular weight (Mn) (Mw/Mn): 1.23, kinematic viscosity at 40° C.: 67.8 mm$^2$/s, kinematic viscosity at 100° C.: 8.20 mm$^2$/s, viscosity index: 86]

Base Oil 3:
Ethylvinylether polymer [number average molecular weight (Mn): 700, ratio of the weight average molecular weight (Mw) to the number average molecular weight (Mn) (Mw/Mn): 1.22, kinematic viscosity at 40° C.: 50.4 mm$^2$/s, kinematic viscosity at 100° C.: 6.81 mm$^2$/s, viscosity index: 86]

Base Oil 4:
Ethylvinylether polymer [number average molecular weight (Mn): 1300, ratio of the weight average molecular weight (Mw) to the number average molecular weight (Mn) (Mw/Mn): 1.20, kinematic viscosity at 40° C.: 62.5 mm$^2$/s, kinematic viscosity at 100° C.: 7.91 mm$^2$/s, viscosity index: 90]

Base Oil 5:
Copolymer of a methylvinylether and ethylvinylether [methylvinylether/ethylvinylether=1/9 (molar ratio), number average molecular weight (Mn): 2000, ratio of the weight average molecular weight (Mw) to the number average molecular weight (Mn) (Mw/Mn): 1.19, kinematic viscosity at 40° C.: 72.6 mm$^2$/s, kinematic viscosity at 100° C.: 8.46 mm$^2$/s, viscosity index: 83]

Base Oil 6:
Copolymer of ethylvinylether and isobutylvinylether [ethylvinylether/isobutylvinylether=8/2 (molar ratio), number average molecular weight (Mn): 400, ratio of the weight average molecular weight (Mw) to the number average molecular weight (Mn) (Mw/Mn): 1.23, kinematic viscosity at 40° C.: 42.3 mm$^2$/s, kinematic viscosity at 100° C.: 6.18 mm$^2$/s, viscosity index: 89]

Base Oil 7:
Copolymer of ethylvinylether and isobutylvinylether [ethylvinylether/isobutylvinylether=9/1 (molar ratio), number average molecular weight (Mn): 400, ratio of the weight average molecular weight (Mw) to the number average molecular weight (Mn) (Mw/Mn): 1.26, kinematic viscosity at 40° C.: 62.1 mm$^2$/s, kinematic viscosity at 100° C.: 7.99 mm$^2$/s, viscosity index: 93]

Base Oil 8:
Ethylvinylether polymer [number average molecular weight (Mn): 1000, ratio of the weight average molecular weight (Mw) to the number average molecular weight (Mn) (Mw/Mn): 1.27, kinematic viscosity at 40° C.: 55.7 mm$^2$/s, kinematic viscosity at 100° C.: 7.35 mm$^2$/s, viscosity index: 90]

Base Oil 9:
Ethylvinylether polymer [number average molecular weight (Mn): 1900, ratio of the weight average molecular weight (Mw) to the number average molecular weight (Mn) (Mw/

Mn): 1.29, kinematic viscosity at 40° C.: 71.0 mm²/s, kinematic viscosity at 100° C.: 8.55 mm²/s, viscosity index: 89]

Base Oil 10:
Copolymer of a methylvinylether and ethylvinylether [methylvinylether/ethylvinylether=1/9 (molar ratio), number average molecular weight (Mn): 2200, ratio of the weight average molecular weight (Mw) to the number average molecular weight (Mn) (Mw/Mn): 1.31, kinematic viscosity at 40° C.: 75.9 mm²/s, kinematic viscosity at 100° C.: 9.10 mm²/s, viscosity index: 93]

Next, on each refrigerating machine oil of Examples 1 to 5 and Comparative Examples 1 to 5, evaluations shown below were performed. The properties of the base oils used and the results obtained are shown together in Tables 1 and 2. It should be noted that, in the tables, "ratio of methyl", "ratio of ethyl", and "ratio of butyl" represent the content of a constituting unit of which $R^5$ is a methyl group, the content of a constituting unit of which $R^5$ is an ethyl group, and the content of a constituting unit of which $R^5$ is a butyl group, respectively, in the above described formula (1) (content in the polyvinylether).

(Evaluation of Various Properties)

Various properties of the refrigerating machine oils were evaluated in compliance with test methods shown below.

Kinematic viscosity: JIS K2283-1993
Pour point: JIS K2269
Flash point: JIS K2265-4
Autoignition point: ASTM E659-1978

(Refrigerant Compatibility Evaluation)

In compliance with JIS-K-2211, "Refrigerating machine oils", "Refrigerant compatibility test method", 10 g of the refrigerating machine oil was added to 10 g of difluoromethane (R32), 2,3,3,3-tetrafluoropropene (HFC-1234yf), or 1,3,3,3-tetrafluoropropene (HFC-1234ze) to observe whether the refrigerant and the refrigerating machine oil were dissolved in each other at 0° C. In the tables, "compatible" means that the refrigerant and the refrigerating machine oil were dissolved in each other, and "separated" means that the refrigerant and the refrigerating machine oil were separated into two layers.

TABLE 1

|  | Example 1 | Example 2 | Example 3 | Example 4 | Example 5 |
|---|---|---|---|---|---|
| Base oil number | 1 | 2 | 3 | 4 | 5 |
| Mn | 500 | 1200 | 700 | 1300 | 2000 |
| Mw/Mn | 1.25 | 1.23 | 1.22 | 1.20 | 1.19 |
| Ratio of methyl [mol %] | 0 | 0 | 0 | 0 | 10 |
| Ratio of ethyl [mol %] | 80 | 90 | 100 | 100 | 90 |
| Ratio of butyl [mol %] | 20 | 10 | 0 | 0 | 0 |
| Kinematic viscosity 40° C. [mm²/s] | 50.2 | 67.8 | 50.4 | 62.5 | 72.6 |
| Kinematic viscosity 100° C. [mm²/s] | 6.90 | 8.20 | 6.81 | 7.91 | 8.46 |
| Pour point [° C.] | <−45 | <−45 | <−45 | <−45 | <−45 |
| Refrigerant | R32 | R32 | R32 | R32 | R32 |
| Compatibility | Compatible | Compatible | Compatible | Compatible | Compatible |
| Refrigerant | HFC-1234yf | HFC-1234yf | HFC-1234yf | HFC-1234yf | HFC-1234yf |
| Compatibility | Compatible | Compatible | Compatible | Compatible | Compatible |
| Refrigerant | HFC-1234ze | HFC-1234ze | HFC-1234ze | HFC-1234ze | HFC-1234ze |
| Compatibility | Compatible | Compatible | Compatible | Compatible | Compatible |
| Flash point [° C.] | 201 | 212 | 206 | 214 | 219 |
| Autoignition point [° C.] | 341 | 345 | 348 | 349 | 353 |

TABLE 2

|  | Comparative Example 1 | Comparative Example 2 | Comparative Example 3 | Comparative Example 4 | Comparative Example 5 |
|---|---|---|---|---|---|
| Base oil number | 6 | 7 | 8 | 9 | 10 |
| Mn | 400 | 400 | 1000 | 1900 | 2200 |
| Mw/Mn | 1.23 | 1.26 | 1.27 | 1.29 | 1.31 |
| Ratio of methyl [mol %] | 0 | 0 | 0 | 0 | 10 |
| Ratio of ethyl [mol %] | 80 | 90 | 100 | 100 | 90 |
| Ratio of butyl [mol %] | 20 | 10 | 0 | 0 | 0 |
| Kinematic viscosity 40° C. [mm²/s] | 42.3 | 62.1 | 55.7 | 71.0 | 75.9 |
| Kinematic viscosity 100° C. [mm²/s] | 6.18 | 7.99 | 7.35 | 8.55 | 9.10 |
| Pour point [° C.] | <−45 | <−45 | <−45 | <−45 | <−45 |
| Refrigerant | R32 | R32 | R32 | R32 | R32 |
| Compatibility | Compatible | Compatible | Compatible | Compatible | Separated |
| Refrigerant | HFC-1234yf | HFC-1234yf | HFC-1234yf | HFC-1234yf | HFC-1234yf |
| Compatibility | Compatible | Compatible | Compatible | Compatible | Compatible |
| Refrigerant | HFC-1234ze | HFC-1234ze | HFC-1234ze | HFC-1234ze | HFC-1234ze |
| Compatibility | Compatible | Compatible | Compatible | Compatible | Compatible |
| Flash point [° C.] | 181 | 191 | 178 | 186 | 185 |
| Autoignition point [° C.] | 314 | 322 | 319 | 328 | 331 |

REFERENCE SIGNS LIST

1 . . . compressor, 2 . . . condenser, 3 . . . desiccator, 4 . . . expansion mechanism, 5 . . . evaporator, 6 . . . passage, 10 . . . refrigerating machine.

The invention claimed is:

1. A refrigerating machine oil comprising a polyvinylether having a structural unit represented by the following formula (1):

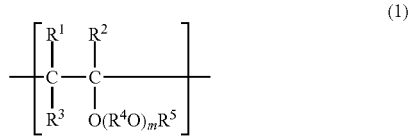

wherein $R^1$, $R^2$, and $R^3$ are the same or different from each other and each represent a hydrogen atom or a hydrocarbon group, $R^4$ represents a divalent hydrocarbon group or an ethereal oxygen-containing divalent hydrocarbon group, $R^5$ represents a hydrocarbon group, m represents an integer of 0 or more, and in the case where m is 2 or more, a plurality of $R^4$ are the same or different from each other,
a number average molecular weight Mn of the polyvinylether is 500 or more and 2000 or less,
a ratio of a weight average molecular weight Mw to a number average molecular weight Mn, Mw/Mn, of the polyvinylether is 1.10 or more and 1.25 or less,
a flash point of the polyvinylether is 195° C. or more,
an autoignition point of the polyvinylether is 335° C. or more, and
the refrigerating machine oil is utilized with a mildly flammable hydrofluorocarbon refrigerant.

2. A working fluid composition for a refrigerating machine, comprising:
the refrigerating machine oil according to claim 1; and
a mildly flammable hydrofluorocarbon refrigerant.

3. The working fluid composition for a refrigerating machine according to claim 2, wherein the mildly flammable hydrofluorocarbon refrigerant comprises at least one selected from difluoromethane, 1,3,3,3-tetrafluoropropene, and 2,3,3,3-tetrafluoropropene.

4. A method of flame-retarding a refrigerating machine in which a mildly flammable hydrofluorocarbon refrigerant is utilized, the method comprising utilizing, as a refrigerating machine oil, a composition comprising a polyvinylether having a structural unit represented by a following formula (1):

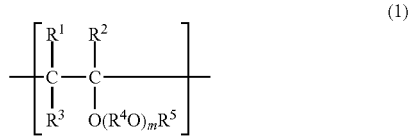

wherein $R^1$, $R^2$, and $R^3$ are the same or different from each other and each represent a hydrogen atom or a hydrocarbon group, $R^4$ represents a divalent hydrocarbon group or an ethereal oxygen-containing divalent hydrocarbon group, $R^5$ represents a hydrocarbon group, m represents an integer of 0 or more, and in the case where m is 2 or more, a plurality of $R^4$ are the same or different from each other,
a number average molecular weight Mn of the polyvinylether is 500 or more and 2000 or less, and
a ratio of a weight average molecular weight Mw to the number average molecular weight Mn, Mw/Mn, of the polyvinylether is 1.10 or more and 1.25 or less,
a flash point of the polyvinylether is 195° C. or more, and
and autoignition point of the polyvinylether is 335° C. or more.

5. The refrigerating machine oil according to claim 1, wherein the Mw/Mn of the polyvinylether is 1.17 or more and 1.25 or less.

6. The refrigerating machine oil according to claim 1, wherein the Mw/Mn of the polyvinylether is more than 1.20 and 1.25 or less.

7. A working fluid composition for a refrigerating machine, comprising:
the refrigerating machine oil according to claim 5; and
a mildly flammable hydrofluorocarbon refrigerant comprising at least one selected from difluoromethane, 1,3,3,3-tetrafluoropropene, and 2,3,3,3-tetrafluoropropene.

8. A working fluid composition for a refrigerating machine, comprising:
the refrigerating machine oil according to claim 6; and
a mildly flammable hydrofluorocarbon refrigerant comprising at least one selected from difluoromethane, 1,3,3,3-tetrafluoropropene, and 2,3,3,3-tetrafluoropropene.

9. The refrigerating machine oil according to claim 1, wherein the number average molecular weight Mn of the polyvinylether is 900 or more and 2000 or less.

10. A working fluid composition for a refrigerating machine, comprising:
the refrigerating machine oil according to claim 9; and
a mildly flammable hydrofluorocarbon refrigerant comprising at least one selected from difluoromethane, 1,3,3,3-tetrafluoropropene, and 2,3,3,3-tetrafluoropropene.

11. The refrigerating machine oil according to claim 1, wherein a kinematic viscosity of the polyvinylether at 40° C. is 50 mm²/s or more and 80 mm²/s or less.

12. The refrigerating machine oil according to claim 9, wherein a kinematic viscosity of the polyvinylether at 40° C. is 50 mm²/s or more and 80 mm²/s or less.

13. A working fluid composition for a refrigerating machine, comprising:
the refrigerating machine oil according to claim 11; and
a mildly flammable hydrofluorocarbon refrigerant comprising at least one selected from difluoromethane, 1,3,3,3-tetrafluoropropene, and 2,3,3,3-tetrafluoropropene.

14. A working fluid composition for a refrigerating machine, comprising:
the refrigerating machine oil according to claim 12; and
a mildly flammable hydrofluorocarbon refrigerant comprising at least one selected from difluoromethane, 1,3,3,3-tetrafluoropropene, and 2,3,3,3-tetrafluoropropene.

15. The method according to claim 4, wherein the Mw/Mn of the polyvinylether is more than 1.20 and 1.25 or less.

16. The method according to claim 15, wherein the mildly flammable hydrofluorocarbon refrigerant comprising at least one selected from difluoromethane, 1,3,3,3-tetrafluoropropene, and 2,3,3,3-tetrafluoropropene.

17. The method according to claim 4, wherein the number average molecular weight Mn of the polyvinylether is 900 or more and 2000 or less.

18. The method according to claim 17, wherein the mildly flammable hydrofluorocarbon refrigerant comprising at least one selected from difluoromethane, 1,3,3,3-tetrafluoropropene, and 2,3,3,3-tetrafluoropropene.

* * * * *